(No Model.)

L. K. SIGGONS.
TIRE FOR CYCLES.

No. 497,830. Patented May 23, 1893.

Witnesses
John Shaw.
R. W. Bishop.

Inventor
Louis K. Siggons
By Walter W. Calmore
his Attorney

UNITED STATES PATENT OFFICE.

LOUIS K. SIGGONS, OF PHILADELPHIA, PENNSYLVANIA.

TIRE FOR CYCLES.

SPECIFICATION forming part of Letters Patent No. 497,830, dated May 23, 1893.

Application filed August 8, 1892. Serial No. 442,512. (No model.)

*To all whom it may concern:*

Be it known that I, LOUIS K. SIGGONS, a citizen of the United States, residing at Philadelphia, in the county of Philadelphia and State of Pennsylvania, have invented certain new and useful Improvements in Tires for Cycles, of which the following is a specification, reference being had therein to the accompanying drawings.

My invention relates to pneumatic tires for cycles and aims especially to provide a tire which will not be deflated if punctured.

The invention consists in certain novel features hereinafter described and claimed.

Figure 1:
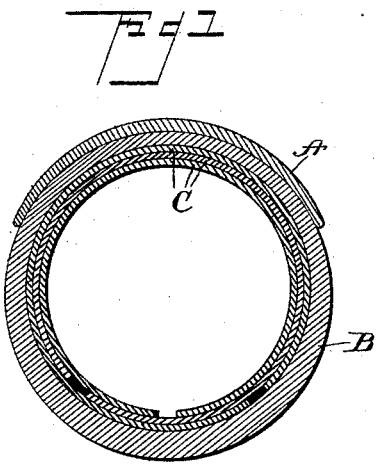
Figure 2:
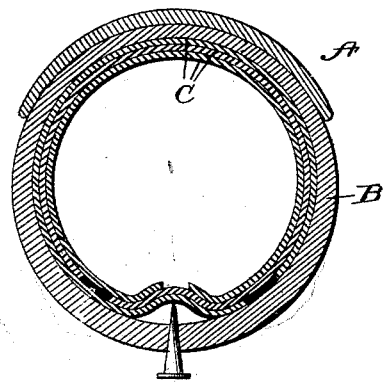

In the annexed drawings, Figure 1 is a transverse section of a pneumatic tire constructed in accordance with my invention and Fig. 2 is a similar view showing the effect of a puncture.

Referring to the drawings more particularly, A designates the usual metallic rim of the cycle wheel and B the outer elastic inflatable tube which forms the outer or riding portion of the tire. Within the outer tube I arrange a series of concentric layers C of rubber, or other material which is impervious to air. These lining layers, it will be noticed, have their meeting edges so arranged as to break joint, that is to say, the joint in each section is out of alignment with the joints of the adjacent sections. In practice, when the tire is inflated, the inner layers or lining will be pressed against the inner surface of the outer elastic tube and the joints will be held closed and smooth as shown in Fig. 1. Should the wheel pass over a nail or other sharp protuberance and the tire be punctured, the entering point will push the layers of the lining inward and the edges of each section will separate slightly. The lining will thus be permitted to yield to the entering force and at the same time prevent the escape of the compressed air, for the body of each section will pass over the opening between the edges of the sections next to it.

My tire is very cheap and simple and its advantages are thought to be obvious.

Having thus fully described my invention, what I claim, and desire to secure by Letters Patent, is—

The improved tire consisting of an inflatable tube, and a lining for said tube composed of a concentric series of layers having their edges free and arranged out of alignment or so as to break joint.

In testimony whereof I affix my signature in the presence of two witnesses.

LOUIS K. SIGGONS.

Witnesses:
JNO. W. MCCLAIN,
WALTER W. CALMORE.